United States Patent
Haramoto et al.

(10) Patent No.: US 8,338,054 B2
(45) Date of Patent: Dec. 25, 2012

(54) PROTON TRANSPORTING MATERIAL, STARTING MATERIAL THEREOF, ION EXCHANGE MEMBRANE, MEMBRANE ELECTROLYTE ASSEMBLY, AND FUEL CELL USING THE SAME

(75) Inventors: Yuichiro Haramoto, Kofu (JP); Kohei Shiramizu, Tokyo (JP); Masashi Oota, Tokyo (JP)

(73) Assignees: University of Yamanashi, Kofu-Shi, Yamanashi (JP); Toppan Printing Co., Ltd., Tokyo (JP)

( * ) Notice: Subject to any disclaimer, the term of this patent is extended or adjusted under 35 U.S.C. 154(b) by 149 days.

(21) Appl. No.: 12/920,744

(22) PCT Filed: Mar. 3, 2009

(86) PCT No.: PCT/JP2009/054376
§ 371 (c)(1),
(2), (4) Date: Sep. 2, 2010

(87) PCT Pub. No.: WO2009/110631
PCT Pub. Date: Sep. 11, 2009

(65) Prior Publication Data
US 2011/0003902 A1    Jan. 6, 2011

(30) Foreign Application Priority Data
Mar. 4, 2008   (JP) .................. 2008-053945

(51) Int. Cl.
*H01M 8/02* (2006.01)
*H01M 8/10* (2006.01)
*C09K 19/52* (2006.01)
*C09K 19/54* (2006.01)
*C07C 303/02* (2006.01)
*C07C 309/04* (2006.01)
*C07C 309/05* (2006.01)
*C07C 309/11* (2006.01)

(52) U.S. Cl. ........ 429/493; 429/400; 429/476; 429/483; 429/492; 429/494; 252/299.01; 252/299.5; 521/31; 521/33; 558/44; 558/51

(58) Field of Classification Search ............. 252/299.01, 252/299.5; 521/31, 33; 558/44, 51; 568/660, 568/667; 429/400, 476, 483, 492, 493, 494
See application file for complete search history.

(56) References Cited

U.S. PATENT DOCUMENTS
7,375,176 B2 *  5/2008  Litt et al. ...................... 528/171
(Continued)

FOREIGN PATENT DOCUMENTS
JP           01-271402          10/1989
(Continued)

OTHER PUBLICATIONS
CAPLUS 1997: 631555.*

*Primary Examiner* — Shean C Wu
(74) *Attorney, Agent, or Firm* — Weingarten, Schurgin, Gagnebin & Lebovici LLP

(57) ABSTRACT

There are provided: a proton transporting material that improves mechanical characteristics of a sulfonated liquid crystalline polymer material, can be kept as a membrane even though it is made a solid state while maintaining a molecular arrangement of a liquid crystalline state, and is suitable for electrolyte membranes of fuel cells etc.; an ion exchange membrane, a membrane electrolyte assembly (MEA), and a fuel cell that use the proton transporting material; a starting material for the proton transporting material. The proton transporting material has a molecular structure produced by crosslinking the sulfonated liquid crystalline polymer material with a crosslinking agent having two or more functional groups in sites except that of the sulfonic acid group.

15 Claims, 6 Drawing Sheets

U.S. PATENT DOCUMENTS

2006/0228609 A1 10/2006 Takahashi et al.
2007/0117872 A1 5/2007 Kawai et al.

FOREIGN PATENT DOCUMENTS

| | | |
|---|---|---|
| JP | 03-041043 | 2/1991 |
| JP | 2003-55337 | 2/2003 |
| JP | 2004-146279 | 5/2004 |
| JP | 2005-194517 | 7/2005 |
| JP | 2006-179448 | 7/2006 |
| JP | 2006-291059 | 10/2006 |
| JP | 2007-35611 | 2/2007 |
| JP | 2007-213988 | 8/2007 |

* cited by examiner (B) A sulfonated liquid crystalline polymer material produced by crosslinking with a crosslinking agent having two or more functional groups

PROTON TRANSPORTING MATERIAL, STARTING MATERIAL THEREOF, ION EXCHANGE MEMBRANE, MEMBRANE ELECTROLYTE ASSEMBLY, AND FUEL CELL USING THE SAME

TECHNICAL FIELD

The present invention relates to a proton transporting material, its starting material, an ion exchange membrane, a membrane electrolyte assembly and a fuel cell using the same, and more specifically to the proton transporting material having a molecular structure produced by crosslinking a sulfonated liquid crystalline polymer material with a specific crosslinking agent, the proton transporting material being excellent in mechanical characteristics, compared to any prior non-crosslinked sulfonated liquid crystalline polymer material, and also providing a solid electrolyte membrane having a passage for protons controlled as well as exhibiting high proton conductivity even in low humidity conditions and being excellent in stability, particularly to the proton transporting material and its starting material useful for ion exchange membranes, membrane electrolyte assemblies (hereinafter, may be called MEA), fuel cells, etc., to the ion exchange membrane, the membrane electrolyte assembly and the fuel cell using the same.

TECHNICAL BACKGROUND

Fuel cells have recently attracted attention as effective solutions to environmental and energy problems. A fuel cell oxidizes a fuel such as hydrogen using an oxidant such as oxygen and converts the resulting chemical energy into electrical energy.

Fuel cells are classified into alkaline type, phosphoric acid type, polymer electrolyte type, molten carbonate type, solid oxide type, etc., depending on the kinds of electrolytes.

Polymer electrolyte fuel cells (PEFC) have a low temperature operation and a high power density and thus are capable of miniaturization and lightening, thereby being expected to be applied as portable power supplies, domestic power supplies or vehicle power sources.

Although a perfluorocarbon slfonic acid membrane is used as an electrolyte membrane for polymer electrolyte fuel cells (PEFC), it poses the problem of the environmental load in disposal being high since the membrane contains fluorine.

Hence, a hydrocarbon film not containing fluorine (see Patent Document 1) has been developed. The sulfonic acid group in this hydrocarbon film not containing fluorine shows excellent proton conductivity since the group can dissociate a hydrogen ion.

When power is generated using a polymer electrolyte fuel cell, humidified hydrogen is fed to an anode and humidified oxygen to a cathode in an MEA in order to enhance its power generation performance. Therefore, a humidifier is needed for a fuel cell system, whereby a polymer electrolyte fuel cell that does not need a humidifier, or a low or no humidity MEA is desired for cost effectiveness and compactification.

However, for conventional hydrocarbon films, sulfonic acid groups ($SO_3H$ groups) are at random positions as shown in a conceptual diagram in FIG. 4, so that a passage for protons can hardly be made and thus there is the problem that the proton conductivity tends to be readily low particularly in low humidity conditions.

A hydrocarbon film having hydrophilic and hydrophobic sites controlled is proposed for solving this problem (see Patent Document 2). In this hydrocarbon film, a passage for protons made by hydrophilic sites is formed by phase separation as shown in a conceptual diagram of FIG. 5, so it is still insufficient although the film exhibits relatively high proton conductivity even in low humidity conditions.

On the other hand, in a liquid crystalline state of a sulfonated liquid crystalline monomer material having a smectic phase, ionic conduction sites of the sulfonic acid groups are found to be laid on top of another densely. In addition, it is proposed that a solid state of maintaining a molecular arrangement of the liquid crystalline state exhibit excellent proton conductivity since a more controlled passage for protons is formed as illustrated in a conceptual diagram of FIG. 6 (see Patent Document 3).

However, there is a problem in that sulfonated liquid crystalline monomer material does not have sufficient mechanical characteristics and thus cannot be used as a membrane.

Hence, a sulfonated liquid crystalline polymer is considered to be used in place of sulfonated liquid crystalline monomer material. Incidentally, if the polymer can be made a solid state while maintaining a molecular arrangement of a liquid crystalline state, as shown in FIG. 7, the membrane exhibits high proton conductivity even in low humidity or no humidity conditions since a membrane in which a more controlled passage for protons is formed can be obtained.

In this case, the disordered molecular arrangement in the solid state is made to be phase-transferred to a liquid crystalline state once, and the disordered molecular arrangement is put in order, and then cooled to obtain a solid in which a passage for protons is formed. However, the sulfonated liquid crystalline polymer shown in FIG. 7 is still insufficient in mechanical characteristics and is difficult to retain as a membrane.

Patent Document 1: Japanese Patent Laid-Open No. 2006-179448
Patent Document 2: Japanese Patent Laid-Open No. 2005-194517
Patent Document 3: Japanese Patent Laid-Open No. 2003-55337

DISCLOSURE OF THE INVENTION

The first object of the present invention is to provide a proton transporting material that improves mechanical characteristics of a sulfonated liquid crystalline polymer material, can be kept as a membrane even though it is made a solid state while maintaining a molecular arrangement of a liquid crystalline state, and is suitable for electrolyte membranes of fuel cells etc.; the second object of the present invention is to provide an ion exchange membrane, membrane electrolyte assembly (MEA), and fuel cell that use the proton transporting material; and the third object of the present invention is to provide a starting material for the proton transporting material.

To solve the subjects as stated above, the present inventors have diligently studied and obtained the following findings.

That is to say, for example, when a sulfonated liquid crystalline monomer is polymerized to synthesize a sulfonated liquid crystalline polymer having mesogen (unit rich in rigidity and having a structure in which two or more rings, such as an aromatic ring, are connected to each other) and a specific molecular structure, a crosslinking agent having two or more functional groups is added to and mixed with this sulfonated liquid crystalline monomer and copolymerizes them to intermolecularly crosslink the molecules in a site except that of the sulfonic acid group to thereby be able to obtain a sulfonated liquid crystalline polymer which has a crosslinked structure shown in the conceptual diagrams of FIGS. 1 to 3 and in which a controlled passage for protons is formed and which exhibits excellent proton conductivity. The inventors found that the sulfonated liquid crystalline polymer having the crosslinked structure exhibits sufficient mechanical characteristics, maintains it as a membrane, and is suitable to electrolyte membranes of fuel cells etc., even if the polymer is made a solid state while maintaining the molecular arrangement of the liquid crystalline state, thus having achieved the present invention.

A proton transporting material in accordance with a first embodiment of the present invention is characterized in having a molecular structure produced by crosslinking a sulfonated liquid crystalline polymer material with a crosslinking agent having two or more functional groups in a site except that of the sulfonic acid group. In addition, the proton transporting material has sufficient mechanical characteristics even if returned to a solid state while maintaining a molecular arrangement of a liquid crystalline state, can be kept as a membrane and also has a controlled passage for protons formed therein, whereby the proton transporting material has the significant effects of exhibiting high proton conductivity even in low humidity or no humidity conditions, being useful as an electrolyte membrane for fuel cells and, in addition to expected cost reduction in fuel cells, being available as an ion exchange membrane, etc.

The proton transporting material in accordance with a second embodiment of the present invention is characterized in that the above sulfonated liquid crystalline polymer material is expressed by the general formula (1) below and has the further significant effects of surely tending to exhibit liquid crystallininty and further improving proton conductivity.

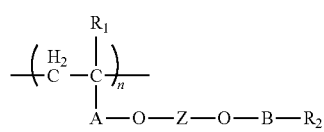
(1)

In the general formula (1), $R_1$ represents a hydrogen atom or methyl group, $R_2$ represents a sulfonic acid group or a sulfonic acid group and phosphonic acid group, A represents an alkylene group, $-C_6H_4-CH_2-$, $-CO-O(CH_2)_{m1}-$ or $-CO-$, B represents an alkylene group, Z represents a mesogenic group, n represents an integer of 2 or more, and m1 represents an integer of 1 or more.

In accordance with a third embodiment, the proton transporting material is expressed by the general formula (2) below in the proton transporting material described in the second embodiment, wherein Z is biphenyl in said general formula (1) and has the further significant effect of further improving proton conductivity.

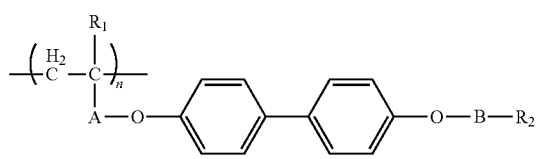
(2)

In the general formula (2), $R_1$ represents a hydrogen atom or methyl group, $R_2$ represents a sulfonic acid group or a sulfonic acid group and phosphonic acid group, A represents an alkylene group, $-C_6H_4-CH_2-$, $-CO-O(CH_2)_{m1}-$ or $-CO-$, B represents an alkylene group, n represents an integer of 2 or more, and m1 represents an integer of 1 or more.

The proton transporting material in accordance with a fourth embodiment of the present invention is characterized in that in the proton transporting material described in the third embodiment, the above sulfonated liquid crystalline polymer material is expressed by the general formula (1), wherein $R_1$ represents a methyl group, A represents $-CO-O(CH_2)_{m1}-$, and B represents $-(CH_2)_{m2}-$ and m2 represents an integer of 1 to 10 and has the further significant effect of still further improving proton conductivity.

The proton transporting material in accordance with a fifth embodiment of the present invention is characterized in that it is a sulfonated liquid crystalline polymer material wherein in the proton transporting material described in the fourth embodiment, m1 represents an integer of 1 to 18, and has the further significant effects of surely tending to exhibit liquid crystallinity and further improving proton conductivity.

The proton transporting material in accordance with a sixth embodiment of the present invention is characterized in that in the proton transporting material described in the first embodiment, the sulfonated liquid crystalline polymer material having the molecular structure produced by crosslinking with the crosslinking agent having two or more functional groups in a site except that of the sulfonic acid group is produced by copolymerizing a sulfonated liquid crystalline monomer with a crosslinking agent having two or more functional groups and has the further significant effects of tending to control the blend ratio of the sulfonated liquid crystalline monomer and the crosslinking agent having two or more functional groups and improving mechanical strength without spoiling liquid crystallinity.

The proton transporting material in accordance with a seventh embodiment of the present invention is characterized in using (1/3 to 1/130)mol of the crosslinking agent having two or more functional groups for 1 mol of the sulfonated liquid crystalline monomer, in the proton transporting material described in the sixth embodiment and has the further significant effect of surely improving mechanical strength while surely exhibiting liquid crystalinity.

The proton transporting material in accordance with an eighth embodiment of the present invention is characterized in using 1 to 30 molecules of the crosslinking agent having two or more functional groups for 100 units of the sulfonated liquid crystalline polymer material expressed by the general formula (1) or (2) above wherein the case where n is 1 in the general formula (1) or (2) above is defined as 1 unit, in the proton transporting material described in the second embodiment and has the further significant effect of improving mechanical strength while exhibiting mesomorphism.

The proton transporting material in accordance with a ninth embodiment of the present invention is characterized in using 1 to 30 molecules of the crosslinking agent having two or more functional groups for 100 units of the sulfonated liquid crystalline polymer material expressed by the general formula (1) or (2) above wherein the case where n is 1 in the general formula (1) or (2) above is defined as 1 unit, in the proton transporting material described in the third embodiment and has the further significant effect of surely improving mechanical strength while surely exhibiting mesomorphism.

The proton transporting material in accordance with a tenth embodiment of the present invention is characterized in that in the proton transporting material described in any one of the foregoing embodiments, the molecular arrangement of a liquid crystalline state of the sulfonated liquid crystalline polymer material having the molecular structure produced by crosslinking with the crosslinking agent having two or more functional groups in a site except that of the sulfonic acid group is utilized in a liquid crystalline state and has the further significant effect of exhibiting higher proton conductivity.

The proton transporting material in accordance with an eleventh embodiment of the present invention is characterized in that in the proton transporting material described in any one of the first to ninth embodiments, the molecular arrangement of a liquid crystalline state of the sulfonated liquid crystalline polymer material having the molecular structure produced by crosslinking with the crosslinking agent having two or more functional groups in a site except that of the sulfonic acid group is utilized in a solid state and has the further significant effect of exhibiting higher proton conductivity.

The proton transporting material in accordance with a twelfth embodiment of the present invention is characterized in that in the proton transporting material described in the tenth or eleventh embodiments, the liquid crystalline state is smectic thereby having the further significant effect of surely improving proton conductivity.

The invention in accordance with a thirteenth embodiment described in of the present invention includes a crosslinking agent having two or more functional groups that can characteristically crosslink in a site except that of the sulfonic acid group without spoiling the liquid crystallinity of the sulfonated liquid crystalline polymer material and has the significant effect of improving mechanical characteristics of the sulfonated liquid crystalline polymer film while maintaining liquid crystallinity of the sulfonated liquid crystalline polymer material even if the sulfonated liquid crystalline polymer material is crosslinked.

The crosslinking agent having two or more functional groups in accordance with a fourteenth embodiment of the present invention is characteristically expressed by the general formula (3) below in the crosslinking agent having two or more functional groups described in the thirteenth embodiment and has the further significant effect of further improving mechanical characteristics of the sulfonated liquid crystalline polymer film while maintaining the mesomorphism of the sulfonated liquid crystalline polymer material.

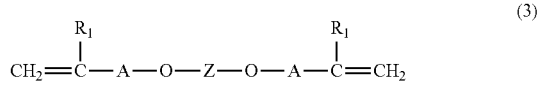

(3)

In the general formula (3), $R_1$ represents a hydrogen atom or methyl group, A represents an alkylene group, —$C_6H_4$—$CH_2$—, —CO—O($CH_2$)$_{m1}$— or —CO—, and Z represents a mesogenic group.

The crosslinking agent having two or more functional groups in accordance with a fifteenth embodiment of the present invention is characteristically expressed by the general formula (4) below in the crosslinking agent having two or more functional groups described in the fourteenth embodiment, wherein Z is biphenyl in the general formula (3) above and has the further significant effects of exhibiting excellent proton conductivity and further improving mechanical characteristics of the sulfonated liquid crystalline polymer film while maintaining the liquid crystallinity of the sulfonated liquid crystalline polymer material.

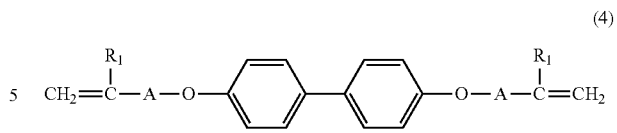

(4)

In the general formula (4), $R_1$ represents a hydrogen atom or methyl group, and A represents an alkylene group, —$C_6H_4$—$CH_2$—, —CO—O($CH_2$)$_{m1}$— or —CO—.

The crosslinking agent having two or more functional groups in accordance with a sixteenth embodiment of the present invention is characterized in that in the crosslinking agent having two or more functional groups described in the fifteenth embodiment, A in the general formula (4) above is expressed by —CO—O($CH_2$)$_{m1}$— and has the further significant effect of further improving mechanical characteristics of the sulfonated liquid crystalline polymer film.

The crosslinking agent having two or more functional groups in accordance with a seventeenth embodiment of the present invention is characterized in that in the crosslinking agent having two or more functional groups described in claim 16, m1 is expressed by an integer of 1 to 18 and has the further significant effects of exhibiting excellent proton conductivity and further improving mechanical characteristics of the sulfonated liquid crystalline polymer film while maintaining the liquid crystallinity of the sulfonated liquid crystalline polymer material.

The invention in accordance with an eighteenth embodiment of the present invention includes an ion exchange membrane that characteristically uses the proton transporting material described in any one of the first twelve embodiments and has the significant effect of exhibiting excellent ion exchange capacity.

The invention in accordance with a nineteenth embodiment of the present invention includes a membrane electrolyte assembly (MEA) that characteristically uses the proton transporting material described in any one of the first twelve embodiments and has the significant effects of exhibiting high adhesion properties with the catalytic electrode, exhibiting expected high proton conductivity even in low humidity or no humidity conditions and being useful as fuel cell use.

The invention in accordance with a twentieth embodiment of the present invention includes a fuel cell that characteristically uses the proton transporting material described in any one of the first twelve embodiments and has the significant effects of exhibiting expected high proton conductivity even in low humidity or no humidity conditions, showing excellent power generation characteristics even in low humidity conditions and also having expected cost reduction.

FIG. 2 is an explanatory view schematically depicting the state of proton transport by the proton transporting material of the present invention having a molecular structure obtained by crosslinking a sulfonated liquid crystalline polymer material obtained by polymerization of a sulfonated liquid crystalline monomer with a small amount of a phosphonated liquid crystalline monomer with a crosslinking agent having two or more functional groups in sites except those of the sulfonic acid group and the phosphonic acid group.

FIG. 3 is an explanatory view schematically depicting the state of proton transport by the proton transporting material of the present invention in which the phase transition temperature is decreased by blending a material having a phosphonic acid group with the proton transporting material having a molecular structure obtained by crosslinking a sulfonated liquid crystalline polymer material obtained by polymerization of a sulfonated liquid crystalline monomer with a crosslinking agent having two or more functional groups in a site except that of the sulfonic acid group.

FIG. 4 is an explanatory view schematically depicting a conventional proton transport state by a hydrocarbon containing a sulfonic acid group not including fluorine.

FIG. 5 is an explanatory view schematically depicting a conventional proton transport state by another hydrocarbon containing a sulfonic acid group, controlling hydrophilic and hydrophobic sites.

FIG. 6 is an explanatory view schematically depicting a proton transport state in a solid state maintaining the molecular arrangement of a liquid crystalline state of a sulfonated liquid crystalline monomer material that has a smectic phase.

FIG. 7 is an explanatory view schematically depicting the molecular structure and proton transport state of a conventional sulfonated liquid crystalline polymer.

FIG. 8 is a cross-sectional illustration diagram of one embodiment of a membrane electrolyte assembly in which an electrode catalyst layer is formed on both sides of the electrolyte membrane.

FIG. 9 is an exploded sectional view indicating the construction of a single cell of a polymer electrolyte fuel cell installed with the membrane electrolyte assembly shown in FIG. 8.

FIG. 10(a) shows the electrolyte membrane of the proton transporting material of Comparative Example 1 under a polarization microscope; FIG. 10(b) shows the electrolyte membrane of the proton transporting material of Example 1 under a polarization microscope.

DESCRIPTION OF THE PREFERRED EMBODIMENTS

FIG. 1 is an explanatory view schematically depicting the state of proton transport by the proton transporting material of the present invention having a molecular structure obtained by crosslinking a sulfonated liquid crystalline polymer material obtained by polymerization of a sulfonated liquid crystalline monomer with a crosslinking agent having two or more functional groups in a site except that of the sulfonic acid group.

FIG. 2 is an explanatory view schematically depicting the state of proton transport by the proton transporting material of the present invention having a molecular structure obtained by crosslinking a sulfonated liquid crystalline polymer material obtained by polymerization of a sulfonated liquid crystalline monomer with a small amount of a phosphonated liquid crystalline monomer with a crosslinking agent having two or more functional groups in sites except those of the sulfonic acid group and the phosphonic acid group.

FIG. 3 is an explanatory view schematically depicting the state of proton transport by the proton transporting material of the present invention in which the phase transition temperature is decreased by blending a material having a phosphonic acid group with the proton transporting material having a molecular structure obtained by crosslinking a sulfonated liquid crystalline polymer material obtained by polymerization of a sulfonated liquid crystalline monomer with a crosslinking agent having two or more functional groups in a site except that of the sulfonic acid group.

(Proton Transporting Material of the Present Invention)

A proton transporting material of the present invention characteristically includes a molecular structure produced by crosslinking a sulfonated liquid crystalline polymer material with a crosslinking agent having two or more functional groups in a site except that of the sulfonic acid group.

The proton transporting materials of the present invention specifically include, for example, a proton transporting material having the molecular structure illustrated in FIG. 1, produced by crosslinking a sulfonated liquid crystalline polymer material obtained by polymerizing a sulfonated liquid crystalline monomer described below, preferably expressed by the general formula (1) or (2) above, with the crosslinking agent having two or more functional groups expressed by the general formula (3) or (4) above; a proton transporting material having the molecular structure indicated in FIG. 1, produced by copolymerizing preferably a sulfonated liquid crystalline monomer described below with the crosslinking agent having two or more functional groups, expressed by the general formula (3) or (4) above; or a proton transporting material having the molecular structure shown in FIG. 2, produced by crosslinking with a crosslinking agent having two or more functional groups, in sites except those of the sulfonic acid group and the phosphonic acid group, a sulfonated liquid crystalline polymer material obtained by copolymerizing a sulfonated liquid crystalline monomer described below with a small amount of a phosphonated liquid crystalline monomer [a phosphonated liquid crystalline monomer capable of constituting a unit, in which $R_2$ in the general formula (1) above is a phosphonic acid group, by copolymerizing with a sulfonated liquid crystalline monomer]; or a proton transporting material in which the phase transition temperature is decreased by blending a material having a phosphonic acid group with the proton transporting material having a molecular structure obtained by crosslinking a sulfonated liquid crystalline polymer material obtained by polymerization of a sulfonated liquid crystalline monomer described below with a crosslinking agent having two or more functional groups in a site except that of the sulfonic acid group, as shown in FIG. 3.

The materials decreasing the phase transition temperature preferably include a material having a phosphonic acid group expressed by the general formula (6) or (7) described below and a material having a sulfonic acid group. The reason is that there is a possibility that the proton transport capability is further raised. On the other hand, although even a material having a mesogenic skeleton that has no proton transport capability can be expected to have the effect of decreasing the phase transition temperature, it is not preferred from the viewpoint of proton transport capability.

If the site of a sulfonic acid group or a phosphonic acid group included in the sulfonated liquid crystalline polymer material is crosslinked, the proton conductivity is spoilt.

Of these, a proton transporting material produced by copolymerizing a sulfonated liquid crystalline monomer with a crosslinking agent having two or more functional groups is more preferred since the material can improve the mechanical strength of the sulfonated liquid crystalline polymer film while maintaining the liquid crystalinity of the sulfonated liquid crystalline polymer material and also the blend ratio can be readily controlled in the copolymerization of the both of them.

When a proton transporting material is produced by copolymerizing a sulfonated liquid crystalline monomer with the above crosslinking agent having two or more functional groups, the above crosslinking agent is preferably used at (⅓ to 1/130) mol, more preferably used at (1/9 to 1/25) mol, based on 1 mol of the sulfonated liquid crystalline monomer.

If the amount of the above crosslinking agent exceeds ⅓ mol, it tends to be gelated; if the amount of the above crosslinking agent is less than 1/130 mol, there is unpreferably a fear that the mechanical strength of the sulfonated liquid crystalline polymer film cannot be improved.

In addition, as a crosslinking method, for example, a benzene ring of a mesogen included in a sulfonated liquid crystalline polymer material can be crosslinked with a benzene ring of a mesogen possessed by a crosslinking agent having two or more functional groups by a methylene linkage or a methylol bond. However, since liquid crystallinity is spoilt or easily lost, a crosslinkage is desirably formed between the main chains of a sulfonated liquid crystalline polymer material as shown in FIGS. 1 to 3.

On the other hand, when a sulfonated liquid crystalline polymer material prior to crosslinkage is crosslinked with a crosslinking agent having two or more functional groups, preferably, 1 to 30 molecules of, more preferably, 2 to 20 molecules of a crosslinking agent having two or more functional groups are used for 100 units of the sulfonated liquid crystalline polymer material expressed by the general formula (1) or (2) above when the case where n is 1 in the general formula (1) or (2) above is defined as 1 unit.

If the number of crosslinking agent molecules exceeds 30, the crosslinking reaction advances preferentially among crosslinking agents themselves, causing gellation and thus being inefficient. On the other hand, if the number of crosslinking agent molecules is less than 1, there is unpreferably a fear that the mechanical strength of the sulfonated liquid crystalline polymer film cannot be improved.

(Sulfonated Liquid Crystalline Polymer Material)

The sulfonated liquid crystalline polymer material expressed by the general formula (1) above does not decrease the performance of the proton conductivity, whereby a polymer made up of only the repetition of the unit in which n is 1 in the general formula (1) above, having 100% of the above unit, not containing other heterogeneous components, is particularly preferred. $R_2$ in the general formula (1) above is a sulfonic acid group or a sulfonic acid group and a phosphonic acid group, and may be only a sulfonic acid group or both of a sulfonic acid group and a phosphonic acid group.

When $R_2$ in the general formula (1) above is only a sulfonic acid group, the polymer material is a homopolymer constituted only by the repetition of the unit in which n is 1 in the general formula (1) above where $R_2$ is a sulfonic acid group; when $R_2$ in the general formula (1) above is a sulfonic acid group and a phosphonic acid group, the polymer material is a copolymer in which the unit where n is 1 in the general formula (1) above in which $R_2$ is a sulfonic acid group and the unit where n is 1 in the general formula (1) above in which $R_2$ is a phosphonic acid group coexist in the molecule, for example, alternately or at random, or in a block state.

When $R_2$ is a sulfonic acid group and a phosphonic acid group, the amount of the sulfonic acid group is preferably more than the amount of the phosphonic acid group, and more preferably the amount of the sulfonic acid group is 90% by mole or more and less than 100% by mole and the amount of the phosphonic acid group is a balance of less than 10% by mole. If the amount of the sulfonic acid group is less than 90% by mole, where the operating temperature of the fuel cell is about 80° C., there is the fear of decreasing the proton conductivity, so the phosphonic acid group contributes to a decrease in the phase transition temperature from the solid phase to the liquid crystal phase of the proton transporting material of the present invention.

In the present invention, other copolymerization components except the above can be copolymerized within the range of not spoiling the mechanical characteristics and proton conductivity of the sulfonated liquid crystalline polymer film.

The examples of other copolymerization components include, for example, liquid crystal polymers not having $R_2$ in the general formula (1) or (2) above, and the like. One kind or two or more kinds of these can be used.

In the molecular weight of a sulfonated liquid crystalline polymer, the number average molecular weight is in the range of 1,000 to several ten million, preferably in the range of tens of thousands to millions. If the number average molecular weight is less than 1,000, mechanical characteristics of the sulfonated liquid crystalline polymer film might be spoilt; if the number average molecular weight is several ten million or more, the production of the polymer is difficult and thus the yield might worsen.

Here, in the sulfonated liquid crystalline polymer material expressed by the general formula (1) above, the mesogenic groups Z in the formula include the following. A mesogenic group is typically made up of 2 to 3 rings and a linking group. The ring structures include benzene rings, biphenyl rings, cyclohexane rings, bicyclooctane rings, pyridine rings, pyridazine rings, pyrimidine rings, pyrazine rings, and five-membered rings such as furan rings. On the other hand, the linking groups include ester bonds, azo linkages, oxyazo bonds, azomethylene bonds, dimethylene and oxymethylene, which have large effects on shapes and polarity, in addition to the cases where the linking groups contribute to linearity of triple bonds, double bonds, etc. and polarizability, and the like.

Additionally, the kind of liquid crystal is preferably a smectic liquid crystal since the liquid crystal molecules can be linked to each other more densely and high proton conductivity can be obtained.

Even of the sulfonated liquid crystalline polymer materials expressed by the general formula (1) above, the sulfonated liquid crystalline polymer materials expressed by the general formula (2) above, wherein Z is biphenyl, having a biphenyl backbone, tend to have liquid crystallinity and are more excellent, and even of them, the sulfonated liquid crystalline polymer materials expressed by the general formula (2-1) below, wherein $R_2$ is a sulfonic acid group, having a biphenyl backbone, tend to have liquid crystallinity and are excellent in proton conductivity and thus are particularly preferred.

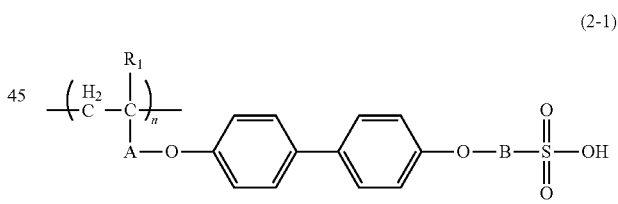

(2-1)

[In the general formula (2-1), $R_1$ represents a hydrogen atom or methyl group, A represents an alkylene group, $-C_6H_4-CH_2-$, $-CO-O(CH_2)_{m1}-$ or $-CO-$, B represents an alkylene group, n represents an integer of 2 or more, and m represents an integer of 1 or more.]

In the sulfonated liquid crystalline polymer materials expressed by the general formula (1), (2) or (2-1) above, $R_1$ represents a hydrogen atom or methyl group, A represents an alkylene group, or a group expressed by $-C_6H_4-CH_2-$, $-CO-O(CH_2)_{m1}-$ or $-CO-$, and the alkylene group may be either linear or branched.

When A is an alkylene group, the alkylene group expressed by $-(CH_2)_{m2}-$ is preferred, and m2 represents an integer of 1 or more, preferably 1 to 18, particularly preferably 1 to 10, since the ones showing liquid crystallinity are preferred. The reason is that when m2 is 19 or more, the liquid crystallinity of the proton transporting material produced by crosslinking the sulfonated liquid crystalline polymer material with a crosslinking agent having two or more functional groups is lost.

The alkylene groups include, for example, a methylene group, ethylene group, trimethylene group, tetramethylene group, pentamethylene group, ethylethylene group, propylene group, butylene group, hexylene group, octadecylene group, nonylene group, decylene group, dodecylene group, and the like. Of these, the alkylene groups having 6 to 10 carbon atoms are more preferred.

In addition, in —CO—O(CH$_2$)$_{m1}$—, m1 is preferably 1 to 18. This is because when m1 is 19 or more, the production of its monomer is difficult.

In the sulfonated liquid crystalline polymer materials expressed by the general formula (1), (2) or (2-1) above, B represents an alkylene group and may be either linear or branched. Specifically, B is preferably an alkylene group having 1 to 18 carbon atoms. The examples include a methylene group, ethylene group, trimethylene group, tetramethylene group, pentamethylene group, ethylethylene group, propylene group, butylene group, hexylene group, octadecylene group, nonylene group, decylene group, dodecylene group, and the like. B is preferably an alkylene group expressed by —(CH$_2$)$_{m2}$— and particularly preferably an alkylene group when m2 (number of carbon atoms) is 1 to 10. This is because when m2 is 11 or more, the production of its monomer is difficult. A and B may be the same alkylene group.

(Crosslinking Agent Having Two or More Functional Groups)

The present invention uses a crosslinking agent having two or more functional groups that can crosslink in a site except that of the sulfonic acid group or the phosphonic acid group without spoiling the liquid crystallinity of the sulfonated liquid crystalline polymer material.

Such crosslinking agent can preferably use the crosslinking agent having two or more functional groups expressed by the general formula (3) above. The crosslinking agent having two or more functional groups expressed by the general formula (4) in which Z is biphenyl in the general formula (3) above can be more preferably used. The reason is that the mesogen of the liquid crystal polymer and the mesogen of the crosslinking agent are stacked together to maintain a passage for protons to thereby exhibit excellent proton conductivity and also develop liquid crystallinity.

R$_1$ in the general formulae (3) and (4) above represents, like R$_1$ in the general formula (1) above, a hydrogen atom or methyl group, A represents an alkylene group, or the group expressed by —C$_6$H$_4$—CH$_2$—, —CO—O(CH$_2$)$_{m1}$— or —CO—, and the alkylene group may be either linear or branched. m1 represents an integer of 1 or more as in the general formula (1) and is preferably 1 to 18 since the polymer material exhibiting liquid crystallinity is preferred. The reason is that when m1 is 19 or more, the liquid crystallinity of the proton transporting material produced by crosslinking the sulfonated liquid crystalline polymer material with a crosslinking agent having two or more functional groups is lost.

When A is an alkylene group, the alkylene group expressed by —(CH$_2$)$_{m2}$— is preferred, and m2 represents an integer of 1 or more, preferably 1 to 10, since the polymer material exhibiting liquid crystallinity is preferred. The reason is that when m2 is 11 or larger, the liquid crystallinity of the proton transporting material produced by crosslinking the sulfonated liquid crystalline polymer material with a crosslinking agent having two or more functional groups is lost.

(Production of the Proton Transporting Material of the Present Invention by Crosslinking the Sulfonated Liquid Crystalline Polymer Material with the Crosslinking Agent Having Two or More Functional Groups in a Site Except that of the Sulfonic Acid Group)

For instance, the proton transporting material of the present invention can be produced by copolymerizing the sulfonated liquid crystalline monomer expressed by the general formula (5) below with the crosslinking agent having two functional groups expressed by the general formula (3) above in the presence of a polymerization initiator by means of radical polymerization such as solution polymerization, suspension polymerization, emulsion polymerization, and bulk polymerization.

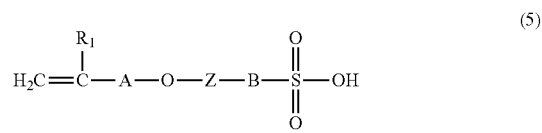

(5)

[in the general formula (5), R$_1$ represents a hydrogen atom or methyl group, A represents an alkylene group, —C$_6$H$_4$—CH$_2$—, —CO—O(CH$_2$)$_{m1}$— or —CO—, B represents an alkylene group, and Z represents a mesogenic group.]

R$_1$, A, B, Z, m1, etc. in the general formula (5) above are the same as R$_1$, A, B, Z, m1, etc. in the general formulae (1) and (2) above.

(Method of Manufacturing MEA)

The proton transporting material of the present invention can be utilized as an electrolyte or ion exchange membrane due to its excellent proton transport properties and high ion exchange capacity. In addition, the proton transporting material of the present invention is utilized to produce a solid electrolyte membrane, which can also be used to produce a membrane electrolyte assembly (MEA) or fuel cell.

FIG. 8 is a cross-sectional illustration diagram of one embodiment of membrane electrolyte assembly (MEA) of the present invention.

The above solid electrolyte membrane 1 is joined and laminated with electrode catalyst layers 2, 3 on its both sides by a common procedure to form a membrane electrolyte assembly 12.

FIG. 9 is an exploded sectional view indicating the construction of one embodiment of a single cell of a polymer electrolyte fuel cell installed with the membrane electrolyte assembly 12. An air electrode side gas diffusion layer 4 and a fuel electrode side gas diffusion layer 5 each having a structure made by applying a mixture of carbon black and polytetrafluoroethylene (PTFE) to carbon paper are arranged respectively facing an electrode catalyst layer 2 and an electrode catalyst layer 3 of the membrane electrolyte assembly 12. This respectively constitutes an air electrode 6 and a fuel electrode 7. Then, a single cell 11 is constituted by sandwiching the electrodes by a pair of separators 10 made of an electrically conductive and gas impermeable material comprising a gas passage 8 for reaction gas circulation facing the single cell and a cooling water passage 9 for cooling water circulation in an opposing principal plane. A fuel cell can be fabricated by the single cell 11 or by laminating the single cells 11.

The following method can be shown as one example of the method of producing an MEA and a fuel cell comprising the MEA using the proton transporting material of the invention.

A membrane is fabricated using the proton transporting material of the present invention.

For example, the proton transporting material of the present invention is dissolved in a solvent that can dissolve it and agitated and mixed and then, for example, the resulting solution is spread onto a substrate and heated and decompressed to remove the solvent, thereby being able to fabricate a film sheet-like membrane.

Next, the membrane fabricated by using the proton transporting material of the present invention is disposed on a support. Then, the proton transporting material of the present invention is made a liquid crystalline state to put the molecular arrangement in order and subsequently is made a solid state, thereby capable of obtaining a solid electrolyte membrane formed by controlling the passage for protons as illustrated in FIG. 1. Now, an electrolyte membrane can be obtained in which a passage for protons closer to that in FIG. 1 is formed using an oriented film where the support is oriented in the thickness direction by means of a rubbing method, a SiO oblique deposition, a surfactant application method, or a magnetic field applying method. Moreover, an electrolyte membrane in which a passage for protons as shown in the passage in FIG. 1 can be obtained even by directly forming in an oriented film a solution in which the proton transporting material is dissolved.

A solid electrolyte layer to which protective films are optionally laminated may be stored. On use, the support and the protective films are peeled and then electrode layers comprising a gas diffusion layer and a catalyst layer are formed on both sides of the solid electrolyte layer, providing an MEA. A separator and auxiliary apparatuses (gas supply device, cooling device, etc.) are assembled there and a fuel cell can be fabricated by its single unit or by laminating the units.

In addition, the thickness of the solid electrolyte layer formed by the proton transporting material in the present invention is suitably and typically about 0.1 to about 500 μm, more preferably 10 to 150 μm. This is because if the formed resistance element is too thick, the resistance value becomes large, and if it is too thin, the mechanical characteristics of the solid electrolyte membrane worsen.

The proton transporting material of the present invention can be used as a liquid or a film. A support can be used when the material is used as a film. Films are used that are made from, for example, polyimide, polyethyleneterephthalate, polypropylene, polyethylene, polyethersulfone, polycarbonate, cycloolefin, norbornene, aluminum pet, and aluminum foil. Surface processing may be applied thereto or several kinds of films may be laminated, for use. The liquid proton transporting material is uniformly applied to a support and dried by hot air or the like and then the solvent is removed to form a solid electrolyte membrane. Although the membrane can be used directly, a protective film is typically laminated on the solid electrolyte membrane for solid electrolyte membrane protection, and for example, is wound in a roll shape for preservation.

Incidentally, the liquid crystal phase of the proton transporting material of the present invention by crosslinking the sulfonated liquid crystalline polymer material with the crosslinking agent having two or more functional groups in a site except that of the sulfonic acid group is a polymer and thus could appear near 200° C. When the phase transition temperature from the solid phase to the liquid crystal phase is about 200° C., the sulfonic acid group of the proton transporting material of the present invention detaches, causing the fear of decreasing the proton conductivity.

For this case, the problem can be solved by blending, for example, a material having a phosphonic acid group that has mesogen in the molecular structure with the proton transporting material of the present invention.

For blending the proton transporting material of the present invention and the above material having a phosphonic acid group, for example, both are dissolved in a solvent capable of dissolving both of them, the resulting material is agitated and mixed and then, for example, spread on a substrate and heated and decompressed to remove the solvent, thereby fabricating the membrane. Next, this membrane is made a liquid crystalline state to put the molecular arrangement in order and then made a solid state to be able to obtain a solid electrolyte membrane.

In this solid electrolyte membrane, as has been shown in FIG. 5 conceptually, the mesogen of the above material having a phosphonic acid group forms a structure in which the mesogen is incorporated between the mesogens having a sulfonic acid group of the proton transporting material of the present invention, so that the passage for protons is controlled and formed, whereby a solid electrolyte membrane can be obtained that exhibits excellent proton conductivity, a decreased phase transition temperature from the solid phase to the liquid crystal phase, and causes no fear of detaching the sulfonic acid group.

(Materials Having a Phosphonic Acid Group Used in the Present Invention)

The material having a phosphonic acid group used in the present invention can preferably use a material having a phosphonic acid group expressed by the general formula (6) below.

$$H_3C\text{-}A\text{-}O\text{—}Z\text{—}O\text{—}B\text{—}R_2 \tag{6}$$

[In the general formula (6), $R_2$ represents a phosphonic acid group or sulfonic acid group, A represents an alkylene group, —$C_6H_4$—$CH_2$—, —CO—O($CH_2$)$_{m1}$— or —CO—, B represents an alkylene group, and Z represents a mesogenic group.]

The material having a phosphonic acid group expressed by general formula (7) below in which Z in general formula (6) above is biphenyl can be more preferably used since its proton conductivity can be further improved.

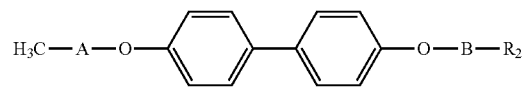

(7)

[In the general formula (7), $R_2$ represents a phosphonic acid group or sulfonic acid group, A represents an alkylene group, —$C_6H_4$—$CH_2$—, —CO—O($CH_2$)$_{m1}$— or —CO—, and B represents an alkylene group.]

A (alkylene group) in the general formulae (6) and (7) above may be either linear or branched. Specifically, the alkylene group having 1 to 10 carbon atoms is preferred, and the examples include a hexylene group, octadecylene group, nonylene group, decylene group, dodecylene group, tetradecylene group, and the like. This reason is that if the number of carbon atoms is 11 or more, the production is difficult.

B in the general formulae (6) and (7) above exhibits an alkylene group and may be either linear or branched. Specifically, B is preferably an alkylene group having 1 to 10 carbon atoms. The examples include a methylene group, ethylene group, trimethylene group, tetramethylene group, pentamethylene group, ethylmethylene group, propylene group, butylene group, hexylene group, octadecylene group, nonylene group, decylene group, dodecylene group, and the like. This is because if the number of carbon atoms is 11 or more, the production is difficult.

It is preferred that when a solid electrolyte membrane is made in the manner described above using a mixture produced by blending a material having a phosphonic acid group and mesogen in the molecular structure with the proton transporting material of the present invention, as shown in FIG. 5 conceptually, a structure is formed in which the mesogen of the above material having the phosphonic acid group is incorporated into between the mesogens having a sulfonic acid group of the proton transporting material of the present invention, so that the mesogens themselves can be densely laminated and also the sulfonic acid groups and the phosphonic acid groups are densely laminated to densely place the ionic conduction sites in a line.

It is preferred that the above material having the phosphonic acid group does not spoil liquid crystallinity even if its amount of addition is increased and the proton conductivity can be improved and also the phase transition temperature from a solid phase to a liquid crystal phase is decreased, whereby a solid electrolyte membrane not causing the fear of detaching the sulfonic acid group can be obtained.

In addition, the description of the above embodiment is only for the description of the present invention, and does not limit the invention described in the claims or restrict the scope. Moreover, all parts of the construction of the present invention are not limited to the above embodiment and various variations within the technical scope described in the claims are possible.

EXAMPLES

Hereinafter, the present invention will be specifically described by way of examples; however, the present invention is by no means limited to the following examples.

Comparative Example 1

<Synthesis of the Proton Transporting Material of the Present Invention Having a Molecular Structure Obtained by Crosslinking a Sulfonated Liquid Crystalline Polymer Material Obtained by Polymerization of a Sulfonated Liquid Crystalline Monomer with a Phosphonated Liquid Crystalline Monomer with a Crosslinking Agent Having Two or More Functional Groups in a Site Except that of the Sulfonic Acid Group>
(Purification of AIBN)

10 grams of azobisbutyronitrile (AIBN) available from Kanto Chemical Co., Inc. is dissolved in 100 mL of ethanol with agitation. Thereafter, the ethanolic solution in which AIBN is dissolved is suction-filtrated, and the impurities are removed. Then, the material is recrystallized in a refrigerator set at 5° C. Subsequently, the material is suction-filtrated to take out the purified AIBN.
(Thermal Polymerization)

In a 10 mL beaker are placed 200 mg of a sulfonated liquid crystalline monomer [sulfonated liquid crystalline monomer having a molecular weight of 476 in which in the general formula (5) above, Z is biphenyl, $R_1$ is a methyl group, A is —CO—O(CH$_2$)$_6$—, and B is —(CH$_2$)$_3$—] and 1 mL of dimethylformamide (DMF) and the resulting material is agitated to dissolve the monomer. This is taken as a first liquid.

In a 10 mL beaker are placed 2.8 mg of purified AIBN and 1 mL of dimethylformamide (DMF) and the resulting material is agitated to dissolve the AIBN. This is taken as a second liquid.

The first and second liquids were placed in a 50 mL eggplant flask, nitrogen substitution was carried out, and the inside was made a decompressed state. Then, the flask was put in an oil bath at about 60° C. and the material was agitated for 60 hours for thermal polymerization.

After the reaction, the resultant material was poured into 100 mL of acetone, the precipitate was suction-filtrated, and a proton transporting material for comparison that was not crosslinked was obtained.

Example 1

(Thermal Polymerization)

In a 10 mL beaker are placed 180 mg of a sulfonated liquid crystalline monomer [sulfonated liquid crystalline monomer having a molecular weight of 476 in which in the general formula (5) above, Z is biphenyl, $R_1$ is a methyl group, A is —CO—O(CH$_2$)$_6$—, and B is —(CH$_2$)$_3$—] and 20 mg of a crosslinking agent having two or more functional groups [in the general formula (3) above, Z is biphenyl, $R_1$ is a methyl group and A is —CO—O(CH$_1$)$_{10}$—], and 1 mL of dimethylformamide (DMF) is added thereto and the resulting material is agitated to dissolve the monomer. This is taken as a first liquid.

In a 10 mL beaker are placed 2.8 mg of purified AIBN and 1 mL of dimethylformamide (DMF) and the resulting material is agitated to dissolve the AIBN. This is taken as a second liquid.

The first and second liquids were placed in a 50 mL eggplant flask, nitrogen substitution was carried out, and the inside was made a decompressed state. Then, the flask was put in an oil bath at about 60° C. and the material was agitated for 60 hours for thermal polymerization.

After the reaction, the resultant material was poured into 100 mL of acetone, the precipitate was suction-filtrated, and a target proton transporting material of the present invention was obtained. Thereafter, the proton transporting material of the present invention was dissolved in a solvent that dissolves it, film formation was performed by a cast method, and its performance was ascertained.

Example 2

(Thermal Polymerization)

In a 10 mL beaker are placed 140 mg of a sulfonated liquid crystalline monomer [sulfonated liquid crystalline monomer having a molecular weight of 476 in which in the general formula (5) above, Z is biphenyl, $R_1$ is a methyl group, A is —CO—O(CH$_2$)$_6$—, and B is —(CH$_2$)$_3$—] and 60 mg of a crosslinking agent having two or more functional groups [in the general formula (3) above, Z is biphenyl, $R_1$ is a methyl group and A is —CO—O(CH$_1$)$_{10}$—], and 1 mL of dimethylformamide (DMF) is added thereto and the resulting material is agitated to dissolve the monomer. This is taken as a first liquid.

In a 10 mL beaker are placed 2.8 mg of purified AIBN and 1 mL of dimethylformamide (DMF) and the resulting material is agitated to dissolve the AIBN. This is taken as a second liquid.

The first and second liquids were placed in a 50 mL eggplant flask, nitrogen substitution was carried out, and the inside was made a decompressed state. Then, the flask was put in an oil bath at about 60° C. and the material was agitated for 60 hours for thermal polymerization.

After the reaction, the resultant material was poured into 100 mL of acetone, the precipitate was suction-filtrated, and a target proton transporting material of the present invention was obtained. Thereafter, the proton transporting material of the present invention was dissolved in a solvent that dissolves it, film formation was performed by a cast method, and its performance was ascertained.

The resulting proton transporting material of the present invention and the proton transporting material for comparison were evaluated for the following attributes.

1. Having special molecular structures for both the type of copolymerization with the crosslinking agent and the type made by crosslinking the liquid crystal polymer with the crosslinking agent (having a molecular structure made by crosslinking the sulfonated liquid crystalline polymer material with the crosslinking agent having two or more functional groups in a site except that of the sulfonic acid group) is evaluated by acid value determination.

2. Not being spoilt in liquid crystallinity (smectic) even if crosslinked is observed under a polarization microscope and evaluated.

3. It is evaluated that mechanical characteristics of the solid electrolyte membrane are excellent by placing the membrane on a hard surface and being cracked or not by hammer hitting.

<Ascertainment of Liquid Crystal Phase>
Apparatus
   1. Polarization microscope: BX51 available from Olympus
   2. Hot stage: LK-600FTIR available from Japan High Tech Co., Ltd.
   3. Preparation: MATSUNAMI MICRO COVER GLASS
Measurement Procedure
   1. The sample is held between two preparations.
   2. One preparation is set in a hot stage.
   3. The polarization microscope is placed in crossed Nicol (Two polarizing plates are orthogonalized and light is prevented from passing).
   4. The hot stage is heated at 5° C./min.
   5. The sample is dark in a solid state and if it has a liquid crystal phase, it has been judged that the sample has a liquid crystalline state when it has flowability and light passes therethrough.

The results obtained by ascertaining the liquid crystal phases of the membranes of Example 1 and Comparative Example 1 are shown in FIGS. 10(a) and 10(b).

The results obtained by evaluating the proton transporting materials of the present invention and the proton transporting material for comparison are summarized in Table 1.

molecular structure produced by crosslinking the sulfonated liquid crystalline polymer material with the crosslinking agent having two or more functional groups in a site except that of the sulfonic acid group from the acid value, and the polymer exhibited liquid crystallinity (smectic) even if crosslinked, as shown in FIG. 10(b). Moreover, it was ascertained that even if the sulfonated liquid crystalline polymer of Example 1 is placed on a hard surface and hit with a hammer, it is not cracked and thus is sufficient in mechanical characteristics, can be maintained as a membrane, and is excellent in mechanical characteristics, so that the fuel cell of the present invention using this solid electrolyte membrane is useful as an electrolyte membrane for fuel cells high in power generation efficiency even in low humidity conditions.

INDUSTRIAL APPLICABILITY

The proton transporting material of the present invention includes a molecular structure produced by crosslinking a sulfonated liquid crystalline polymer material with a crosslinking agent having two or more functional groups in a site except that of the sulfonic acid group and is made improved in mechanical characteristics, has sufficient mechanical characteristics even if returned to a solid state while maintaining a molecular arrangement of a liquid crystalline state, can be kept as a membrane and also has a controlled passage for protons formed therein, thereby having the significant effects of exhibiting high proton conductivity even in low humidity or no humidity conditions, being useful as an electrolyte membrane for fuel cells and, in addition to expected cost reduction in fuel cells, being available as an ion exchange membrane, etc., and thus being high in industrial availability.

EXPLANATION OF REFERENCE NUMERALS

1: Electrolyte membrane
2, 3: Electrode catalyst layer
4: Air electrode side gas diffusion layer
5: Fuel electrode side gas diffusion layer
6: Air electrode
7: Fuel electrode
8: Gas passage
9: Cooling water passage
10: Separator
11: Single cell
12: Membrane electrolyte assembly

TABLE 1

| | Mol ratio | | liquid crystallinity | Membrane characteristics | Ion exchange capacity (meq/g) |
| --- | --- | --- | --- | --- | --- |
| | Monomer | Crosslinking agent | | | |
| Comparative Example 1 | 1 | 0 | ⊚ | Δ | 1.9 |
| Example 1 | 1 | 1/12 | ○ | ○ | 1.5 |
| Example 2 | 1 | 1/3 | ○ | Gel | 0.4 |

From Table 1, it has been ascertained that although the uncrosslinked sulfonated liquid crystalline polymer of Comparative Example 1 shows good liquid crystallinity (smectic) as shown in FIG. 10(a), when the membrane is placed on a hard surface and is hit with a hammer, the membrane is cracked, so that the membrane does not exhibit sufficient mechanical characteristics and is difficult to maintain as a membrane.

From Table 1 also, it was ascertained that the crosslinked sulfonated liquid crystalline polymer of Example 1 has a

The invention claimed is:

1. A proton transporting material comprising: a molecular structure produced by crosslinking a sulfonated liquid crystalline polymer material with a crosslinking agent having two or more functional groups in a site except that of the sulfonic acid group.

2. The proton transporting material according to claim 1, wherein the sulfonated liquid crystalline polymer material is expressed by the general formula

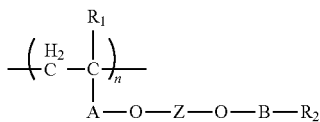
(1)

wherein $R_1$ represents a hydrogen atom or methyl group, $R_2$ represents a sulfonic acid group or a sulfonic acid group and phosphonic acid group, A represents an alkylene group, $—C_6H_4—CH_2—$, $—CO—O(CH_2)_{m1}—$ or $—CO—$, B represents an alkylene group, Z represents a mesogenic group, n represents an integer of 2 or more, and m1 represents an integer of 1 or more.

3. The proton transporting material according to claim 2, wherein Z is biphenyl in the general formula (1) and the general formula (1) is expressed by the general formula

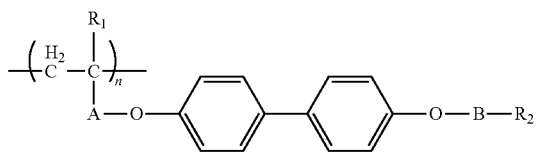
(2)

wherein $R_1$ represents a hydrogen atom or methyl group, $R_2$ represents a sulfonic acid group or a sulfonic acid group and phosphonic acid group, A represents an alkylene group, $—C_6H_4—CH_2—$, $—CO—O(CH_2)_{m1}—$ or $—CO—$, B represents an alkylene group, n represents an integer of 2 or more, and m1 represents an integer of 1 or more.

4. The proton transporting material according to claim 3, wherein the sulfonated liquid crystalline polymer material is expressed by the general formula (1), wherein $R_1$ represents a methyl group, A represents $—CO—O(CH_2)_{m1}—$, and B represents $—(CH_2)_{m2}—$, and m2 represents an integer of 1 to 10.

5. The proton transporting material according to claim 4, wherein the proton transporting material is the sulfonated liquid crystalline polymer material wherein m1 represents an integer of 1 to 18.

6. The proton transporting material according to claim 1, wherein the sulfonated liquid crystalline polymer material having the molecular structure produced by crosslinking with the crosslinking agent having two or more functional groups in a site except that of the sulfonic acid group is produced by copolymerizing a sulfonated liquid crystalline monomer with a crosslinking agent having two or more functional groups.

7. The proton transporting material according to claim 6, wherein (⅓ to 1/130) mol of the crosslinking agent having the two or more functional groups is used for 1 mol of the sulfonated liquid crystalline monomer.

8. The proton transporting material according to claim 2, produced by using 1 to 30 molecules of the crosslinking agent having the two or more functional groups for 100 units of the sulfonated liquid crystalline polymer material expressed by the general formula (1), where in the case where n is 1 in the general formula (1) is defined as 1 unit.

9. The proton transporting material according to claim 3, produced by using 1 to 30 molecules of the crosslinking agent having the two or more functional groups for 100 units of the sulfonated liquid crystalline polymer material expressed by the general formula (2), where in the case where n is 1 in the general formula (2) is defined as 1 unit.

10. The proton transporting material according to claim 1, wherein the molecular arrangement of a liquid crystalline state of the sulfonated liquid crystalline polymer material having a molecular structure produced by crosslinking with the crosslinking agent having two or more functional groups in a site except that of the sulfonic acid group is utilized in a liquid crystalline state.

11. The proton transporting material according to claim 1, wherein the molecular arrangement of a liquid crystalline state of the sulfonated liquid crystalline polymer material having a molecular structure produced by crosslinking with the crosslinking agent having two or more functional groups in a site except that of the sulfonic acid group is utilized in a solid state.

12. The proton transporting material according to claim 10, wherein the liquid crystalline state is smectic.

13. An ion exchange membrane using the proton transporting material according to claim 1.

14. A membrane electrolyte assembly (MEA) using the proton transporting material according to claim 1.

15. A fuel cell using the proton transporting material according to claim 1.

* * * * *

UNITED STATES PATENT AND TRADEMARK OFFICE
CERTIFICATE OF CORRECTION

| | | |
|---|---|---|
| PATENT NO. | : 8,338,054 B2 | Page 1 of 1 |
| APPLICATION NO. | : 12/920744 | |
| DATED | : December 25, 2012 | |
| INVENTOR(S) | : Yuichiro Haramoto et al. | |

It is certified that error appears in the above-identified patent and that said Letters Patent is hereby corrected as shown below:

Title page, item (75) Inventors, "Kofu (JP)" should read --Kofu-Shi, Yamanashi (JP)--;

In the Specifications

Column 5, line 26, delete "described in"; and

Column 6, after line 51, insert the following paragraph:

Figure 1:
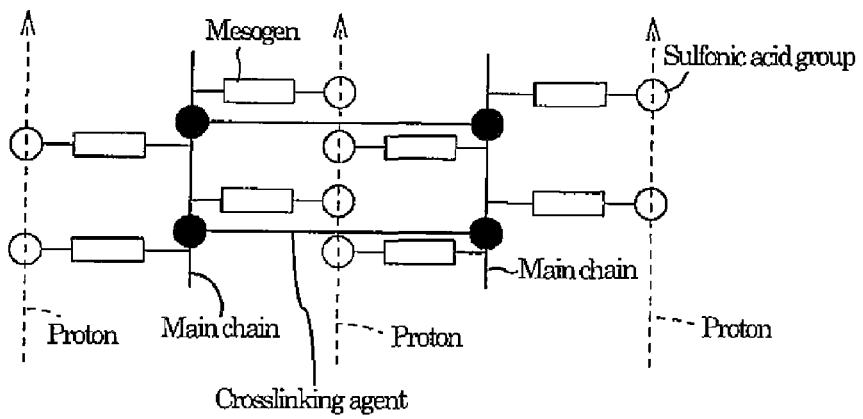
Fig. 1 is an explanatory view schematically depicting the state of proton transport by the proton transporting material of the present invention having a molecular structure obtained by crosslinking a sulfonated liquid crystalline polymer material obtained by polymerization of a sulfonated liquid crystalline monomer with a crosslinking agent having two or more functional groups in a site except that of the sulfonic acid group.--.
Figure 2:
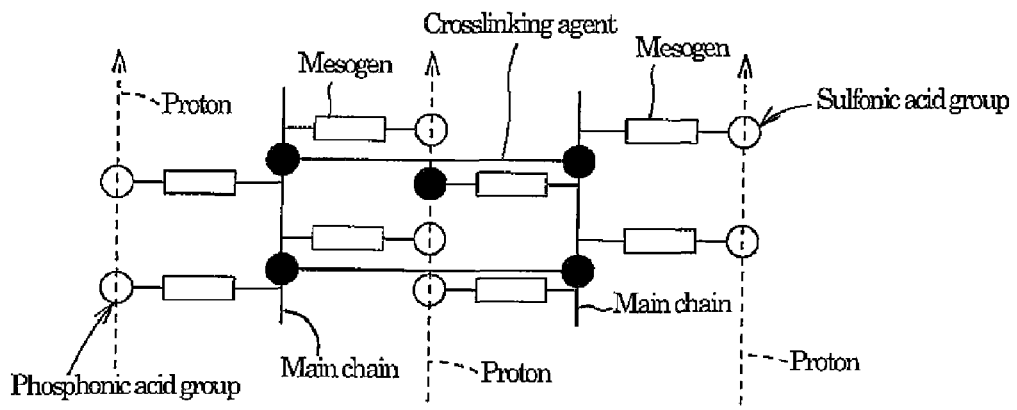
Figure 3:
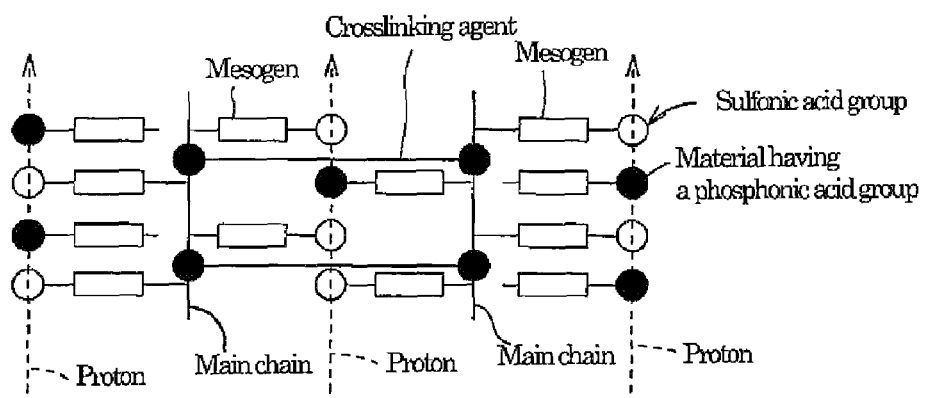
Figure 4:
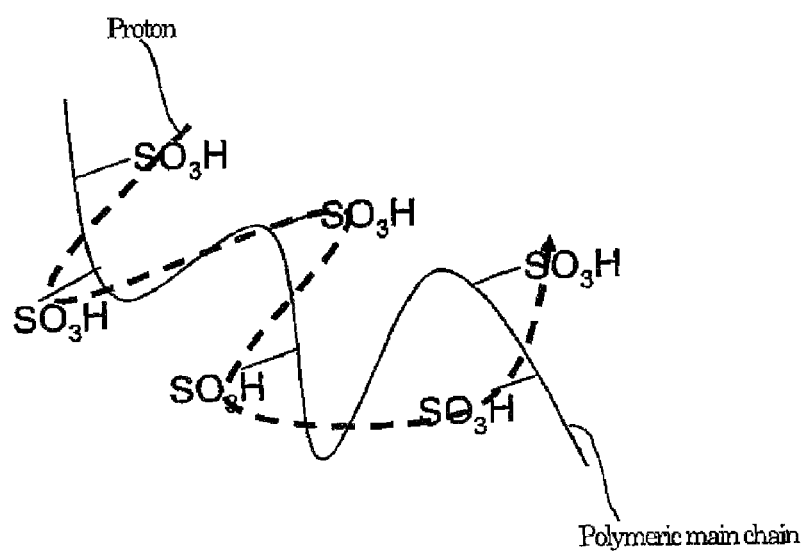
Figure 5:
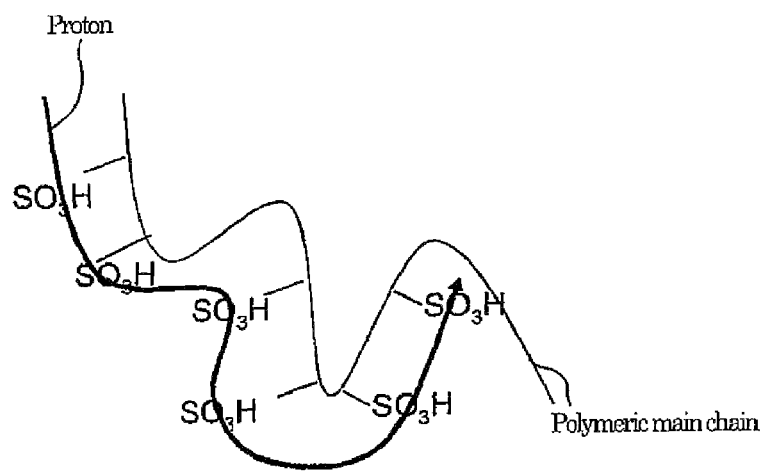
Figure 6:
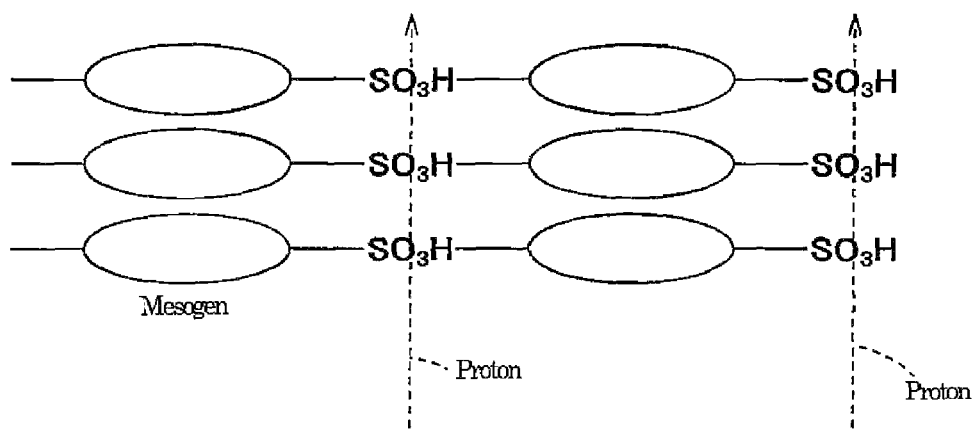
Figure 7:
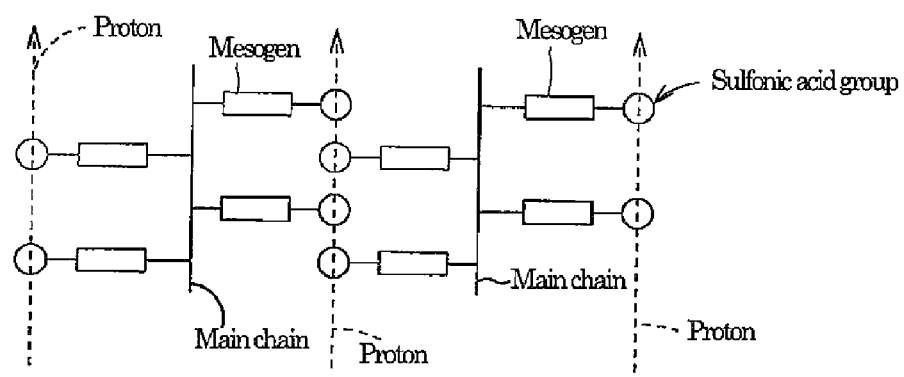
Figure 8:
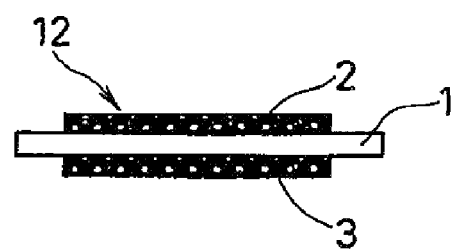
Figure 9:
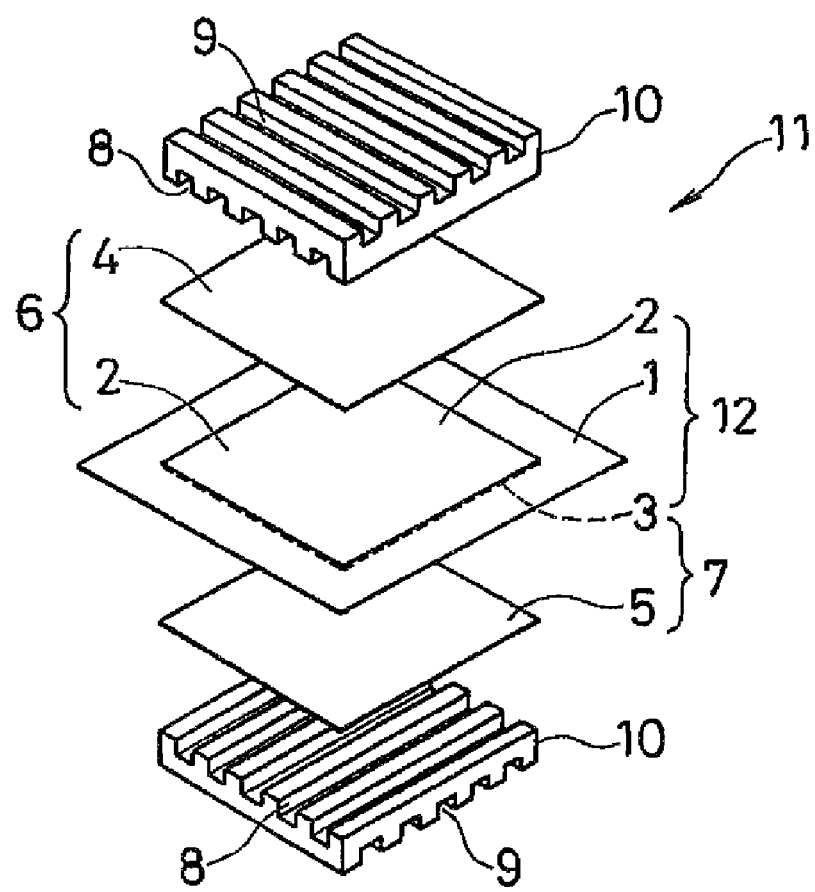
Figure 10:
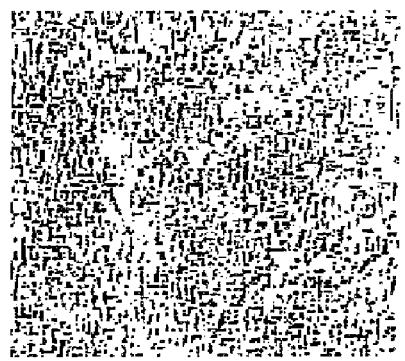
Figure 10:

Signed and Sealed this
Seventeenth Day of December, 2013

Margaret A. Focarino
*Commissioner for Patents of the United States Patent and Trademark Office*